United States Patent [19]

Fleigle

[11] 4,031,696
[45] June 28, 1977

[54] BLADE CONFIGURATION FOR CORDLESS LAWNMOWER

[75] Inventor: Donald Earl Fleigle, Frostburg, Md.

[73] Assignee: The Black and Decker Manufacturing Company, Towson, Md.

[22] Filed: Aug. 8, 1975

[21] Appl. No.: 603,251

[52] U.S. Cl. .................................. 56/295; 56/11.9
[51] Int. Cl.² ........................................ A01D 55/18
[58] Field of Search .................. 56/295, 10.5, 11.9

[56] References Cited

UNITED STATES PATENTS

| 2,909,885 | 10/1959 | Smith | 56/11.9 |
| 3,028,719 | 4/1962 | Jepson | 56/295 |
| 3,538,692 | 11/1970 | Cope et al. | 56/295 |
| 3,911,652 | 10/1975 | Houle | 56/295 |

Primary Examiner—Jay N. Eskovitz
Attorney, Agent, or Firm—Edward D. Murphy; Leonard Bloom

[57] ABSTRACT

In a cordless electric rotary lawnmower, for example, of the type having two counter-rotating blades, a blade configuration providing substantially improved efficiency and performance is disclosed. The lawnmower is battery operated and each blade in a twin blade mower, or the single blade of a single blade mower, is provided with a configuration to maximize cutting effectiveness, air flow and blade life. The blade comprises a generally rectangular strip of metal having a cross section defined by two parallel spaced flat surfaces joined at their ends by generally tapering surfaces. The flat surfaces extend across approximately 50 to 70% of the total width of the blade adjacent the blade ends and preferably extend across about 60%. In addition, the blade deviates from a rectangular strip in that its outer portions are twisted downwardly from a planar portion at the center to define a lift angle to obtain axial air flow. On the bottom surface of the outer portions, the tapering surface comprises a flat to provide a sharp cutting edge.

1 Claim, 5 Drawing Figures

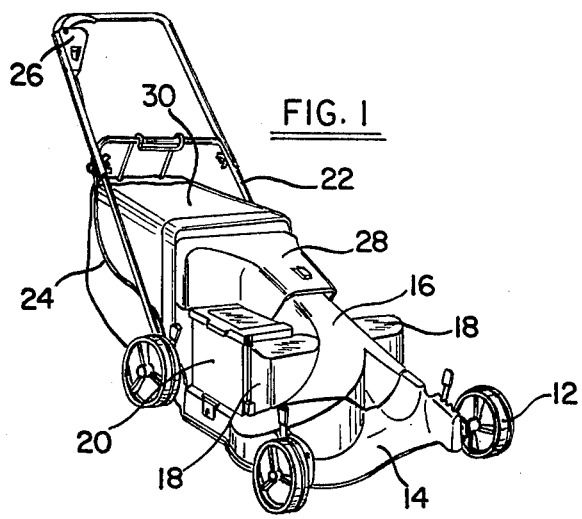
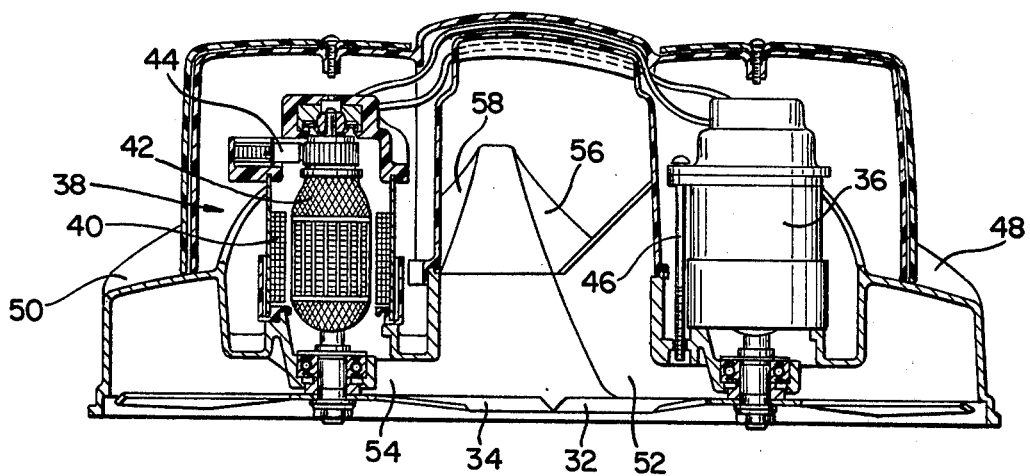
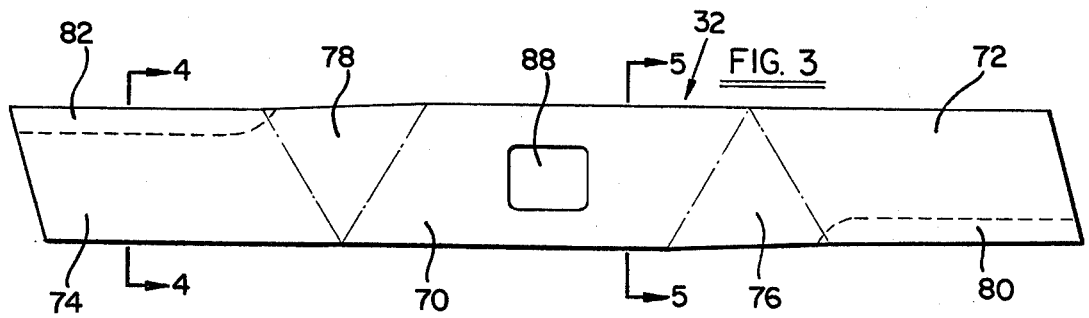

BLADE CONFIGURATION FOR CORDLESS LAWNMOWER

The present invention is directed to an improved cordless electric rotary lawnmower by a battery which incorporates a blade configuration to provide substantially improved cutting, vacuuming and bagging performance.

BACKGROUND

Previous rotary lawnmower blades generally comprise a simple rectangular strip of metal provided with cutting edges by an angular surface ground on the top of the blade and achieving lift by means of a simple curled surface at the back edge of the blade. While such blades function adequately when large amounts of power are readily available, it has been found that these blades are not, in fact, capable of really good performance in terms of either cutting, vacuuming or bagging without excessive amounts of energy being wasted. Other blade designs exist for accomplishing other purposes but no prior art is known which in any suggests a blade configuration which is capable of good performance both as to cutting and as to developing a proper air flow.

BRIEF SUMMARY

Accordingly, the present invention is directed to a unique blade configuration for use in cordless lawnmowers, either of the single blade or multiple blade construction, the blade configuration of accord with this invention providing substantially improved performance. Of course, use of this blade in combination with corded electric lawnmowers or with gasoline powered lawnmowers will also improve the performance of these mowers significantly. The blade configuration comprises a generally rectangular metal strip having a particular air foil cross section and incorporating sharp edges for cutting and a lifting portion for producing air flow. In accord with this invention, the air foil configuration provides improved efficiency of blade travel through the air in the non-lifting region, it improves the air flow in the lifting portion and it reduces blade drag in the lifting portion. In addition, a sharp cutting edge is defined by a flat surfae which is located so as to reduce the difficulty in producing the flat during manufacturing and during resharpening.

Among the objects of this invention is the provision of a lawnmower blade of unique configuration which produces substantially improved performance, particularly in regard to cutting, vacuuming, and grass bagging. Further objects and advantages of this invention will become apparent as the description and illustration thereof proceed.

IN THE DRAWINGS

FIG. 1 is a perspective view of a cordless twin blade rotary electric lawnmower in which the blade of the present invention may be utilized;

FIG. 2 is a diagonal sectional view taken through the cutting region of the lawnmower of FIG. 1;

FIG. 3 is a top plan view of a lawnmower blade in accordance with the present invention;

FIG. 4 is a cross sectional view taken along the lines 4—4 of FIG. 3; and

FIG. 5 is a cross sectional view taken along the lines 5—5 of FIG. 3.

DESCRIPTION

In FIG. 1, a cordless twin blade electric rotary lawnmower is illustrated generally at 10. A lawnmower comprises a plurality of wheels 12 which support a metallic deck 14. The discharge path from the deck is completed by a shroud 16 and a pair of covers 18 are provided to enclose independent electric motors. The deck also supports a battery 20 and a handle 22. Cable 24 and switch 26 provide for operator control of the energization of the motors from the battery. As is also illustrated in FIG. 1, a guard 28 and bag 30 provide for either bagging or non-bagging operation.

FIG. 2 is diagonal cross sectional view taken through the motors and cutting region, as seen looking forwardly from the rear of the mower. In this view, it can be seen that the deck 14 encloses a pair of blades 32, 34, which are respectively driven by the motors 36 and 38. The two motors are substantially identical and both include field magnets 40, and armature 42 and a pair of brushes, one of which is illustrated at 44. Each of the motors is supported in conventional bearings and the motor assembly is mounted to the deck 14 by suitable mounting bolts 46. The rotation of the two motors is opposite so that the two blades counter-rotate and cause respective air flows from the outward section of the deck toward the center section and thus into the discharge chute defined by the shroud 16. It is noted that the view of FIG. 2 is diagonal, the motors and blades being offset relative to the direction of movement of the lawnmower so as to provide overlapping cutting regions without allowing the blades to strike one another.

As is more clearly described and claimed in my co-pending aplication, Ser. No. 603,250, filed concurrently herewith and assigned to the assignee of this invention, the deck shroud shown in FIG. 1 and 2 define a pair of helical convolutes having a slope which causes the air flow through the discharge path to maintain a substantially constant velocity. These convolutes are defined by external surfaces 48, 50 and internal surfaces 52, 54 of the deck 14 and the internal surfaces 56, 58 of the shroud 16. While either the discharge path configuration of the blade configuration disclosed herein may, of course, be used independingly of the other, the combination thereof in a cordless lawnmower provides maximum quality and efficiency of performance.

FIGS. 3, 4 and 5 illustrate the details of a blade constructed in accordance with this invention. The particular blade shown in blade 32, blade 34 being similar but oppositely arranged to provide for rotation in the opposite direction. Of course, a blade for a single blade lawnmower could be manufactured in either configuration according to the desired direction of rotation.

Blade 32 comprises, initially, a generally rectangular strip of metal, preferably shaped by rolling so that along its entire length it has the cross sectional shape shown by the section line portion 60 in FIG. 5. Specifically, this shape comprises corresponding upper and lower surfaces, each of which have a flat portion 62, 64 extending across a major portion of the width of the blade, preferably about 60% although this may be modified to lie between 50 and 70% of the total width without significant deterioration in performance. The remaining 30 to 50% of the width is equally divided on opposite sides of the flat portion and constitutes surfaces 66, 68 which gently taper inwardly toward the opposite sides of the blade. This tapered surface may be either rounded or flat and the end of the blade may comprise either a small flat or rounded point. After rolling the blade to this configuration in a generally flat strip, the blades are cut to the desired length and the lifting surfaces are formed. This is accomplished by holding the blade so that the parallelogram-shaped central portion 70 in FIG. 3 remains flat and the respective ends 72 and 74 are positioned at the appropriate lifting angle, the twist being accommodated within the sloping triangular sections 76, 78 shown in FIG. 3. The lower surface of the sloped section 76 appears in FIG. 5 and the upper surface of the sloped section 78 appears in FIG. 4. As a final operation in shaping the blade, a pair of flats 80, 82 are ground on the lower surfaces of the lifting portions by removing the material indicated by the dotted outlines 84 and 86 also, at some appropriate time in the operation, an aperture 88 is provided for mounting the blade to the electric motor and hardening of the blade metal may be performed if desired.

By considering the respective cross sectional views of FIGS. 4 and 5, it can now be seen that the cross sectional shape defined in detail with regard to the sectional portion of FIG. 5 is substantially preserved throughout the entire length of the blade. The flats 62 and 64 and the tapered surfaces 66 and 68 are present throughout the entire length except where the cutting edge has been prepared by grinding the flats 80, 82. Even here, the same cross sectional shape is retained since the flat constitutes one of the tapered surfaces.

Several unique and very significant aspects of the desired blade shape are embodied in this configuration. First, the air foil shape which enabled several of the benefits identified above to be obtained is strictly maintained throughout the entire length. Even in a region of cutting edges, the air foil shaped as previously defined is retained as the grinding operation does not change the fact that there is a tapered surface occupying approximately 15-25% of a width of the blade and terminating in a point. Furthermore, this blade configuration provides for simplified manufacturing and grinding and also simplified resharpening in that the ground surfaces are flat and lie in the plane of rotation; furthermore, the surfaces are completely parallel to the upper surface of the blade in the region 70 thus providing for very simple location of the blade relative to a grinding wheel.

Another specific advantage of this blade configuration is that, by twisting the lifting surfaces downwardly from the upper plane of the region 70, the region 70 remains as a planar surface for ensuring level mounting of the blade relative to the desired plane of rotation and a recessed area is provided for the end of the motor shaft and the mounting nut, 90 and 92 respectively, shown in FIG. 2.

Considering again the air foil section and lifting regions of the blade, several unique benefits are obtained from this combination. First, since a substantial portion of the blade must simply pass through the air, the provision of an air foil surface in this area minimizes blade drag and therefore minimizes energy lost in this region. Furthermore, the air foil section provided during initial manufacture is easily retained when the lifting surfaces are formed by twisting. This provides maximum efficiency in air movement, thus permitting the grass clippings to be easily and efficiently removed once they are cut. Finally, this blade configuration minimizes contact of the blade with the cut surface of the grass since most of the blade surface is positioned higher than the cutting edge, thus reducing energy loss due to friction of the blade against the grass.

While certain features and advantages of this invention have been illustrated and discussed above, other advantages as well as further changes and modifications which provide these advantages will be really apparent to those skilled in the art without departing from the concept of this invention. It is accordingly intended that the appended claims cover all such changes and modifications as may fall within the true spirit and scope of this invention.

I claim:

1. In a cordless electric lawnmower of the type comprising a housing, a battery supported on said housing, a handle mounted on said housing, a switch supported on said handle, an electric motor mounted on said housing and connected to be energized from said battery via said switch, a blade adapted to be rotated in a horizontal plane within said housing by said motor, and a helical discharge path defined by said housing for receiving air and grass clippings propelled by said blade without causing substantial recutting of said clippings, the improvement comprising an improved configuration for said blade to provide maximum cutting and air propelling efficiency so that said grass clippings tend to remain entrained from the time of severing the clipping to the point of discharge from the mower housing, said configuration comprising an air foil cross section along the full length of said blade, said cross section comprising a generally flat central width section and two converging end sections, said central width section comprising approximately 60% of the width of said blade; said configuration including two lifting regions wherein said cross sectional shape is disposed at an angle to the cutting plane of said mower and a central length region parallel to said cutting plane, said lifting regions lying below the upper surface of said central length region, said configuration providing a recess between the cutting plane of said mower and the lower surface of said central length region for location of mounting means for said blade therein.

* * * * *